March 13, 1962 W. D. BROWN ET AL Re. 25,138

METHOD OF AND APPARATUS FOR HANDLING RAW MATERIALS IN THE PRODUCTION OF HYDROLYED FEATHER MEAL AND OTHER POULTRY BY-PRODUCT MEAL

Original Filed July 30, 1958 6 Sheets-Sheet 1

INVENTOR.
WILLIAM D. BROWN
TOM W. WALLER
BY
Norman Gerlach
ATTY.

March 13, 1962 W. D. BROWN ET AL Re. 25,138

METHOD OF AND APPARATUS FOR HANDLING RAW MATERIALS IN THE PRODUCTION OF HYDROLYED FEATHER MEAL AND OTHER POULTRY BY-PRODUCT MEAL

Original Filed July 30, 1958 6 Sheets-Sheet 2

INVENTORS
WILLIAM D. BROWN
TOM W. WALLER
by: Norman Gerlach
ATTY.

March 13, 1962 W. D. BROWN ET AL Re. 25,138

METHOD OF AND APPARATUS FOR HANDLING RAW MATERIALS IN THE PRODUCTION OF HYDROLYED FEATHER MEAL AND OTHER POULTRY BY-PRODUCT MEAL

Original Filed July 30, 1958 6 Sheets-Sheet 3

INVENTORS
WILLIAM D. BROWN
TOM W. WALLER
by: Norman Herlach
ATTY.

March 13, 1962 W. D. BROWN ET AL Re. 25,138

METHOD OF AND APPARATUS FOR HANDLING RAW MATERIALS IN THE PRODUCTION OF HYDROLYED FEATHER MEAL AND OTHER POULTRY BY-PRODUCT MEAL

Original Filed July 30, 1958 6 Sheets-Sheet 4

INVENTORS
WILLIAM D. BROWN
TOM W. WALLER
by: Norman Gerlach
ATTY.

March 13, 1962 W. D. BROWN ET AL Re. 25,138

METHOD OF AND APPARATUS FOR HANDLING RAW MATERIALS IN THE PRODUCTION OF HYDROLYED FEATHER MEAL AND OTHER POULTRY BY-PRODUCT MEAL

Original Filed July 30, 1958 6 Sheets-Sheet 5

INVENTORS
WILLIAM D. BROWN
TOM W. WALLER by: Norman Gerlach
ATTY.

INVENTORS
WILLIAM D. BROWN
TOM W. WALLER
by: Norman Gerlach
ATTY.

United States Patent Office

Re. 25,138
Reissued Mar. 13, 1962

25,138

METHOD OF AND APPARATUS FOR HANDLING RAW MATERIALS IN THE PRODUCTION OF HYDROLYZED FEATHER MEAL AND OTHER POULTRY BY-PRODUCT MEAL

William D. Brown, Little Rock, Ark., and Tom W. Waller, Girard, Kans., assignors to El Dorado Poultry By-Products Company, Little Rock, Ark., a corporation of Arkansas Original No. 2,975,055, dated Mar. 14, 1961, Ser. No. 751,907, July 30, 1958. Application for reissue Aug. 30, 1961, Ser. No. 136,973
12 Claims. (Cl. 99—7)

Matter enclosed in heavy brackets [ ] appears in the original patent but forms no part of this reissue specification; matter printed in italics indicates the additions made by reissue.

The present invention relates to a method of and an apparatus for handling raw materials, specifically organic waste materials such as poultry feathers and offal resulting from the picking, eviscerating and other processing operations which are performed at a poultry processing plant, in the transportation of these materials from the processing plant to a rendering plant and in the discharge of these materials into a rendering cooker at the rendering plant preparatory to the production of poultry by-product meal.

The disposal of organic waste from poultry packing plants where the poultry is prepared for human consumption has long presented a problem. Prior to the advent of poultry by-product meal, the burden of disposing of such waste products was entirely upon the packer. More recently, however, the use for such waste products as ingredients of poultry by-product meal has in a small measure relieved the packer of a portion of this burden in that the renderer is willing to pay for these waste by-products, as well as to remove them from the premises of the packer and transport them to the rendering plant.

Briefly, the procedure currently *being* followed requires that the packer prepare these waste products by thoroughly cleaning them and packing them in barrels which, at the expense of the renderer, are transported to the rendering plant. Usually, the feathers and the offal, the latter consisting of the entrails, feet and heads of the poultry, have been thoroughly washed separately; then screened to separate the solids from the water; the washed and screened feathers and the washed and screened offal packed into barrels separately; the barrels stacked at a loading platform, utilizing barrels of the 55 gallon variety; and the sealed barrels picked up in trucks by the renderer and transported to the rendering plant. At the rendering plant, the barrels must be opened, and considerable handling resorted to before the contents thereof are finally deposited in the rendering cooker.

All handling operations prior to placement of the loaded barrels on the loading platform are assumed by the packer who must maintain special equipment such as screens for the separation process, the barrels, water disposal facilities for the large quantities of water involved, and the necessary labor for conducting the operations involved. A considerable amount of floor space including a separate loading platform for the renderer is rerequired to accommodate these waste disposal operations, usually an appreciable percentage of the entire packing plant, and the batch operations involved must be correlated in point of time with the picking, eviscerating and other processing operations of the plant and with the renderer's pick-up schedule. Despite such careful planning, the labor and the floor space which is set aside for these disposal purposes are invariably idle for an appreciable portion of any given run.

All handling operations after placement of the loaded barrels on the special loading platform of the packing plant, including removal of the barrels therefrom, are assumed by the renderer who must maintain a fleet of manned trucks for pick-up purposes and return of the empty barrels, as well as adequate labor at the rendering plant for the handling and discharge of the contents of the barrels into the rendering cooker or cookers. Prompt return of the barrels from the renderer to the packer is sometimes possible when the packing and rendering plants are not widely separated and when traffic between the plants is light. By such prompt return, more frequent pick-ups by the renderer may result in a reduction of the number of barrels required for a day's operations.

Cleanliness is a prime consideration for both the packer and the renderer and clean-up operations after each run are not only time-consuming but require the use of additional labor both at the packing plant and at the rendering plant.

The present invention is designed to overcome the above-noted limitations that are attendant upon conventional handling of the waste by-products resulting from poultry processing operations in the transportation thereof from the packing plant to the rendering plant and in the introduction thereof at the rendering plant into the cookers for the production of so-called [hydrolized] *hydrolyzed* feather meal and, toward this end, it contemplates the provision of a novel method, and an apparatus by means of which the method may be carried out, whereby the by-product feathers and offal resulting from poultry processing operations at a packing plant may be continuously and automatically transported to the rendering plant for the production of feather meal immediately as they come available, thereby eliminating batch operations as described above and the attendant labor and equipment required for such batch operations.

Briefly, in carrying out the invention, it is contemplated that the rendering plant shall occupy a site in close proximity to the processing plant, i.e., within a few hundred feet of the *processing* plant, and preferably, but not necessarily, below the level of the processing plant on a downgrade, a 3° downgrade being adequate for the purposes intended as will become clear presently. At the processing plant, substantially all of the floor space ordinarily reserved for batch operations in the washing of poultry feathers and offal, the loading of the washed by-products into barrels, etc., together with the outdoor loading platform where the loaded barrels are temporarily deposited or stacked for pick-up purposes, may be dispensed with and suitable gutters or troughs provided in the picking and eviscerating rooms for discharge of the feathers and offal separately under the influence of a large quantity of wash water to individual discharge openings leading from the building through a wall thereof and located preferably at widely separated regions. The area of floor space required by any given processing plant, and the area of floor space required by a suitable rendering plant capable of handling the by-product output of the processing plant, are such that the two plants may conveniently have approximately the same width. The relative positions of the picking and eviscerating rooms or spaces within the confines of the processing plant may be selected so that the feathers discharged from the automatic pickers employed in the picking operations, and so that the offal discharged from the eviscerating room may conveniently flow or be swept along the various gutters provided for them to the rear corner regions of the building which face the rendering plant from whence these materials may be discharged by gravity from the discharge openings provided for them.

From their respective discharge openings in the rear wall of the packing plant building, the water-borne feathers and offal are discharged by gravity into a pair

[sluices] *sluiceways,* one for the feather-laden water and the other for the offal-laden water. The [sluices] *sluiceways* extend in parallelism down the grade to the rendering plant and communicate with inlet openings *which are* provided [,] preferably in the side walls of the rendering building. For sanitary reasons, the [sluices] *sluiceways* are preferably covered for a major portion of their extent and the walls thereof may be lined with glazed tile or other water impervious material. Where the terrain is of an undulatory nature, deep ground undulations may be bridged by elevated ceramic conduits or the like which form a part of the sluiceways, it being understood that different installations will dictate the requirements for sluiceways of varying construction.

The sluiceways are caused to communicate with the inlet openings in the respective side walls of the rendering plant building at regions which are opposed to each other on opposite sides of the building and which are elevated from the building floor an appreciable distance. The water-borne feathers at one side of the building will pass into the building through a conduit section which preferably projects through the building wall and into the building a slight distance while the water-borne offal at the other side of the building will pass into the same through a similar conduit section so that the streams entering the building may be discharged by gravity into respective portable troughs associated with a novel form of selective screening mechanism employed in connection with the present invention for separating the solids, i.e., the feathers and offal, from the water by means of which they are floated to the rendering plant and for relieving these solids from a portion of their water content prior to introduction thereof to the rendering cookers.

The selective screening mechanism comprises two or more tiltable open-top perforate dump pens or screening bins for reception therein of the feathers and two or more such bins for reception therein of the offal, one pair for each class of by-product being usually sufficient. The feather-receiving screening bins and the offal receiving screening bins are disposed in side-by-side relation on opposite sides respectively of a common conveyor hopper and the various bins are tiltable so that the same, when substantially filled may be tilted and thus have their contents dumped or discharged into the conveyor hopper. The portable troughs leading from the feather inlet and offal inlet respectively are capable of being selectively positioned for register with either of the pair of bins with which they are associated so that while one bin is being tilted for dumping purposes, the other bin may be undergoing filling.

The conveyor trough has associated therewith an endless conveyor chain having material-elevating flights which travel along an incline leading to an overhead platform in the vicinity of the cooker feed opening or openings from whence the materials may be loaded into the cooker or cookers at will.

One of the principal features of the present invention resides in the expeditious use of water so that a minimum amount of water is required for all operations associated with the [process] *method.* The water employed in the [process] *method* is usually a purchased item so that economy in its use is highly desirable. According to the [process] *method,* a quantity of *fresh* water withdrawn from the city mains or other source is first employed for "floating" the offal from the processing plant to the rendering plant along one of the sluiceways as previously described, and water collection and water return means are provided at the rendering plant whereby this initial quantity of water may be pumped continuously, or as needed, from the rendering plant back to the processing plant for further use in floating the feathers from the processing plant to the rendering plant and, thereafter, feather-and-offal-floating operations in the respective sluiceways may be conducted simultaneously. Finally, after all available feathers and offal resulting from any given operation have been transported to the rendering plant and loaded into the rendering cookers, the previously used water which has floated both the feathers and offal to the rendering plant may be used directly, or pumped to storage for subsequent use as a coolant for the cooker vapor-condensing apparatus in the usual manner of vapor condensation during the cooking operations which take place after operations at the processing plant have been completed or after the plant has been shut down for the day. From the above brief description, it will be seen that according to the present method, operations at the rendering plant and at the processing plant are correlated to a certain extent, thus affording convenience to both the packer and the renderer. Throughout the entire material handling [process] *method,* the water employed acts as a diluent for the drippings at the processing plant and as a wash for both the feathers and offal so that prolonged washing operations are inherent in the [process] *method,* while at the same time small bits of eviscera otherwise lost to the renderer and discharged with the wash water, are by the present [process] *method* reclaimed. This almost continuous diluent action and washing operation reduces clean-up operations at the end of any given period to a minimum, both at the processing plant and at the rendering plant and it completely eliminates scrubbing operations such as formerly were required on the various screening devices and other equipment including the transport barrels, loading platform and the like, as well as upon the extensive floor space involved.

The provision of a method and apparatus for handling waste by-products in the production of hydrolyzed feather meal of the character briefly outlined above being among the principal objects of the invention, another object is to provide such a method which is of such simplicity and which, even for large scale operations, involves the use of such a minimum amount of equipment, most of which is permanently installed, that the entire [process] *method* may be attended to by a single operator.

The provision of an apparatus of this sort which is comprised of a minimum number of parts, particularly movable instrumentalities or instrumentalities having moving parts and which, therefore, is unlikely to get out of order; one which may be easily constructed from readily available materials and certain parts of which may be obtained as purchased units on the market, thus resulting in low cost of manufacture; one which may be easily assembled to constitute the complete system, thereby further contributing toward economy of installation; one which is simple in its operation and which, therefore, does not require the use of skilled labor for its operation and attendance; one which, despite the use of a certain amount of outdoor equipment lends itself readily to community landscaping so that it will be in conformity with its surroundings; one which is silent in its operation, does not create objectionable odors, and otherwise meets rigid ordinance and other standards of operation; and one which is well adapted to perform the services required of it are further desirable features which have been borne in mind in the production and development of the present invention.

Other objects and advantages of the invention, not at this time enumerated, will become more readily apparent as the following description ensues.

In the accompanying six sheets of drawings forming a part of this specification, one illustrative embodiment of the invention has been shown.

Figure 1:
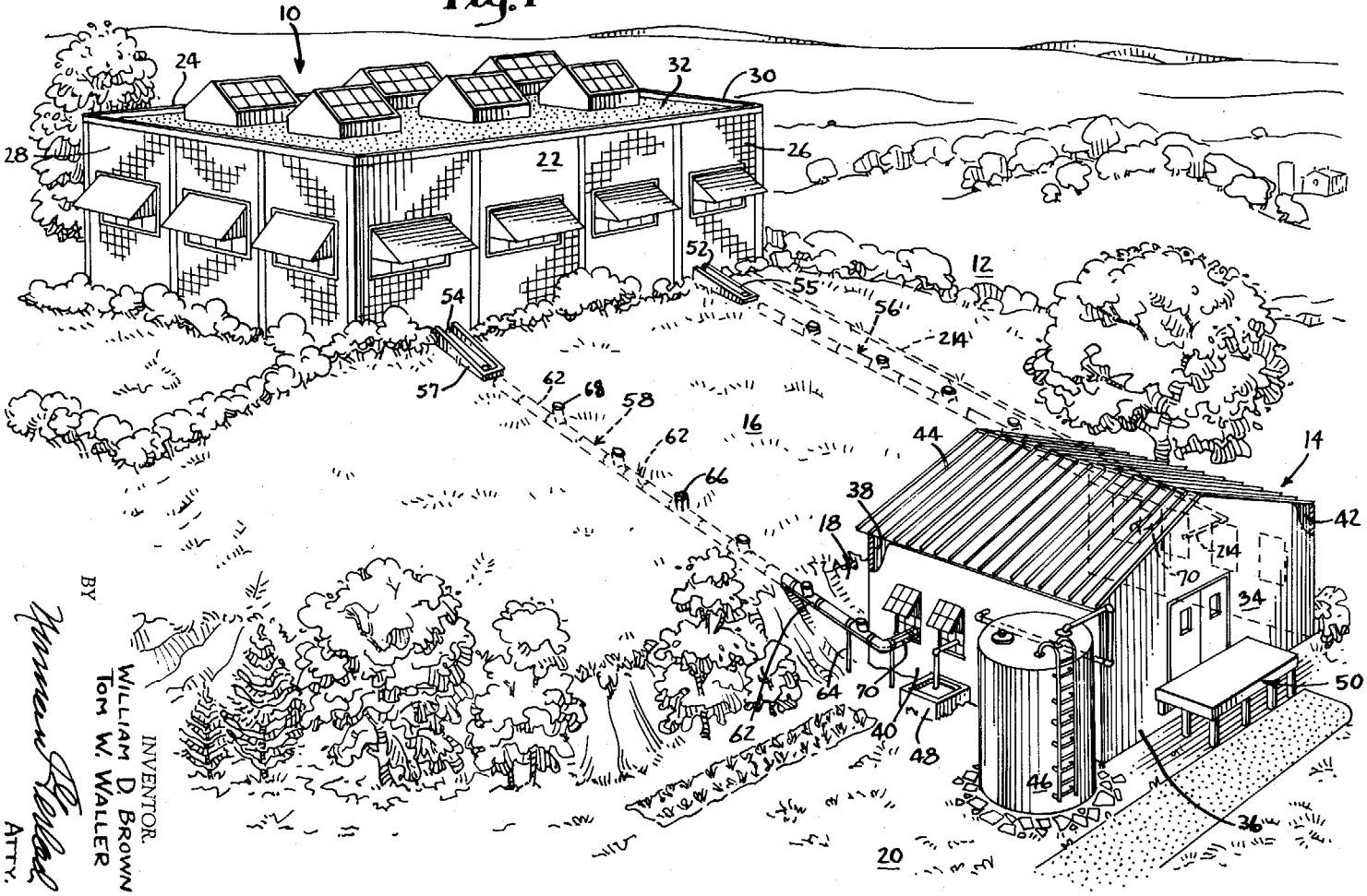
FIG. 1 is a perspective outdoor view of a typical installation illustrating the apparatus of the present invention operatively installed in connection with a rendering plant and an adjacent associated poultry processing plant.

Referring now to the drawings in detail and in particular to FIG. 1, a typical poultry processing and packing plant has been designated in its entirety at 10, the plant being illustrated in its natural outdoor landscaped environment 12. In the illustrated installation of the present invention, the rendering plant 14 has been shown as being situated in the immediate vicinity of the processing plant 10 at the bottom of a slight incline 16 extending from the rear side of the plant 10 to a region near the rear side of the plant 14, at which region the incline 16 makes a relatively sharp dip to provide an embankment 18 leading to the level ground 20 on which the plant proper 14 is situated. The topography surrounding the two plants 10 and 14 in the immediate vicinity thereof and the relative positioning of the plants on the terrain as illustrated herein in FIG. 1 is ideal yet fairly common and similar terrain may be frequently found in nature for the erection of new poultry processing-packing installations according to the present invention by prearrangement between the packer and renderer. Where a renderer erects a rendering plant for cooperation according to the present invention adjacent *to* an existing processing plant not providing the benefits of favorable terrain, for example, having only level ground, or affording rendering facilities only on the upgrade side of the processing plant, the installation may be made according to the present invention but in such instances either landscape modification or pumping facilities not required in the illustrated form of the invention will be required, as will be explained presently. It will be understood, therefore, that different installations may vary widely and the character thereof will be altered to some extent by consideration of terrain, distances between the processing and rendering plants, processing plant floor plans, plant capacities and the like. Irrespective, however, of the particular external and internal aspects of the two mutually cooperative plants, the essential features of the present invention are at all times preserved.

Still referring to FIG. 1, the processing plant 10 is of conventional design and may be in the form of a one story building structure 22 of rectangular design and having front and rear walls 24 and 26, respectively, side walls 28 and 30, respectively, and a roof 32. The rendering plant 14 is in the form of a building structure 34, likewise of rectangular design and having front and rear walls 36 and 38, respectively, side walls 40 and 42, respectively, and a roof 44. The rendering plant further includes an outdoor storage tank 46 for water, the function of which will be set forth subsequently, a sewer 48 and a front loading platform 50.

The details of the processing and packing plant 10 are purely conventional except insofar as the material handling [process] *method* involved in the present invention makes possible the elimination of considerable floor space, usually adjacent *to* the rear of the building, and which otherwise is required for feather and offal washing and packing operations. The building 22, when modified to accommodate the present material handling method and apparatus, makes provision for a discharge opening 52 for water-borne feathers resulting from regular poultry-picking operations and for a discharge opening 54 for water-borne offal resulting from regular head and feet removal and eviscerating operations, all in a manner well known and currently practiced in commercial processing and packing plants of this character.

The two discharge openings 52 and 54 are *formed in the rear wall 26 and are* disposed adjacent *to* the opposite sides of the building 22 substantially at floor level. The discharge opening [52] *54* communicates interiorly of the building with a suitable floor trough or channel (not shown) in the [picking] *eviscerating* room [capable of being initially], *such trough or channel being adapted to be* flooded with fresh water at a predetermined rate, for example, from 120 to 150 gallons per minute [and of being subsequently flooded with water which has been returned from the rendering plant after performing useful work, as will be described presently]. Similarly, the discharge opening [54] *52* communicates interiorly of the building with a similar floor trough or channel in the [eviscerating] *picking* room [capable of being], *such trough or channel being adapted to be* flooded with [such returned] water *which is returned from the rendering plant 14 as described hereafter.*

Figure 2:
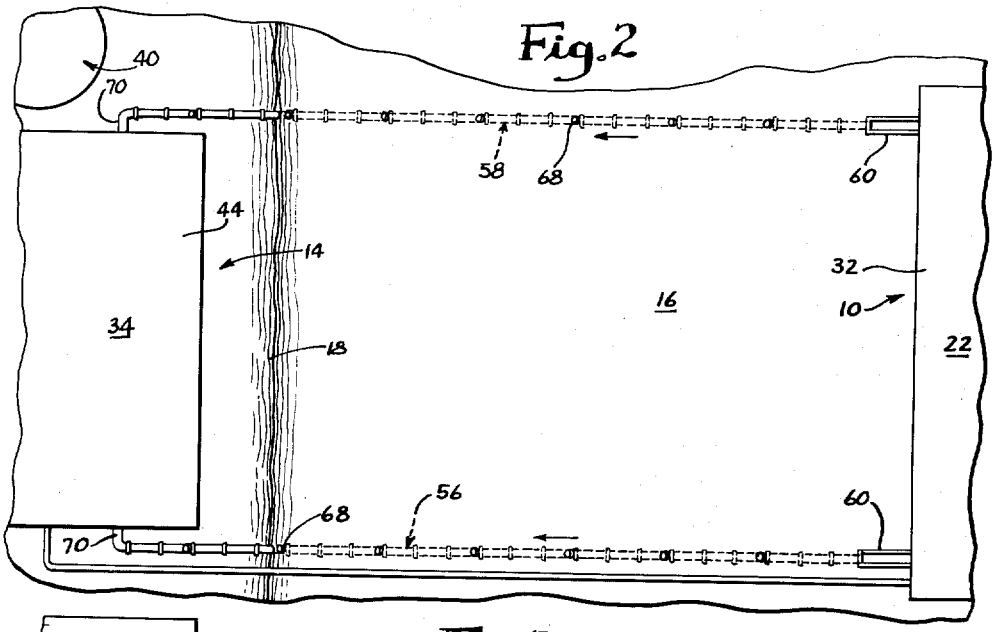
FIG. 2 is a fragmentary plan view of a portion of the installation shown in FIG. 1.
Figure 3:
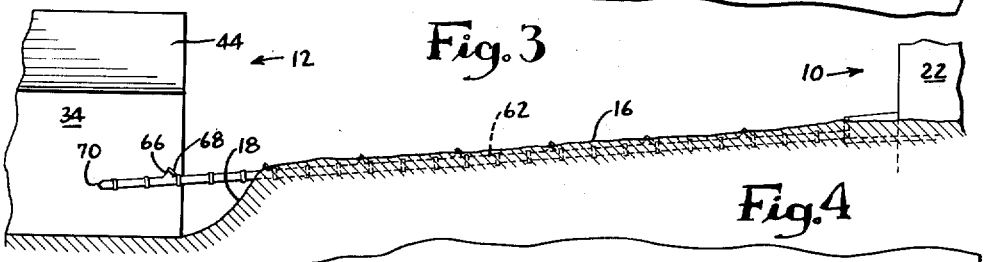
FIG. 3 is a side elevational view of the structure shown in FIG. 2.
Figure 4:
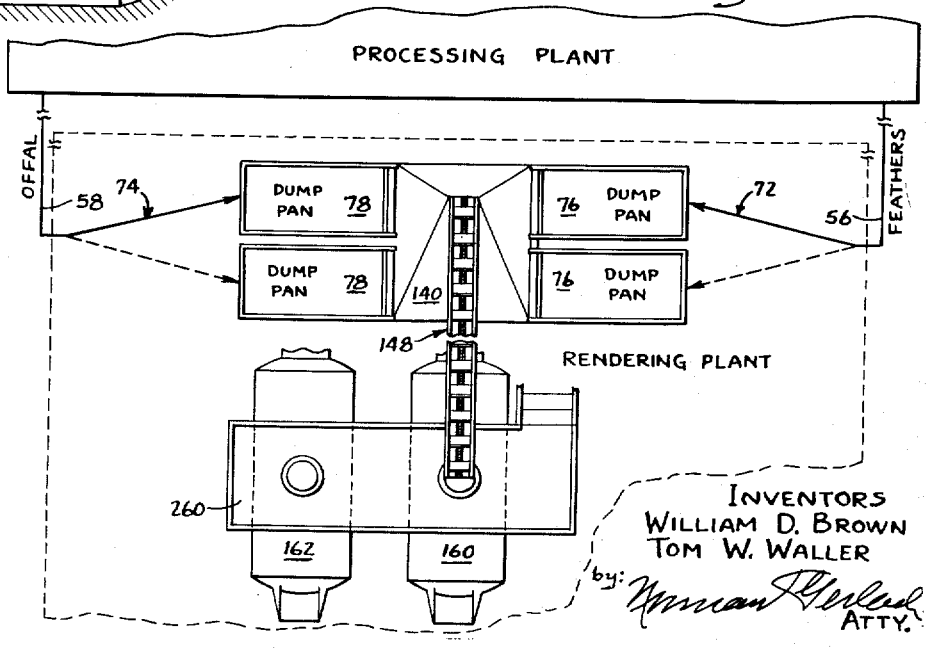
FIG. 4 is a flow chart of the [process] *method* involved in connection with the invention.

The discharge opening 52 is in register with an open sluice box 55 at one end of a sluiceway 56 while the discharge opening 54 is in register with an open sluice box 57 at one end of a sluiceway 58, the two sluiceways extending generally in parallelism down the incline 16 toward the rendering plant 14. Each sluiceway comprises, in addition to the sluice box 55 or [56] 57, a series of underground tubular conduit sections 62 leading from the sluice box. As the sluiceways 56 and 58 encounter the steep incline or embankment 18 (see [also] FIGS. 2 and 3), the conduit sections 62 emerge from the ground and from thence to the point at which they enter building 34, they are maintained elevated above the level of the ground by suitable supports 64 (*see FIG. 1*). Certain of the conduit sections 62 are provided with exposed cleaning openings 66 adapted to be closed by removable cover plates 68. The two sluiceways 56 and 58 extend past the rear wall 38 of the building 34 and then turn inwardly as at 70 and enter the building 34 through the side walls 42 and 40, respectively, at an elevated level which may be approximately shoulder height. In the interests of cleanliness, the various conduit sections 62 are preferably formed of glazed ceramic material which is moisture-impervious and, therefore, easy to clean. From the above description, it will be seen that water-borne feathers issuing from the discharge opening 52 will be conducted by gravity flow along the sluiceway 56 and caused to enter the building 34 through the wall 42 thereof, while water-borne offal issuing from the discharge opening 54 will be conducted by gravity flow along the sluiceway 58 and caused to enter the building 34 through the wall 40 thereof.

Figure 8:
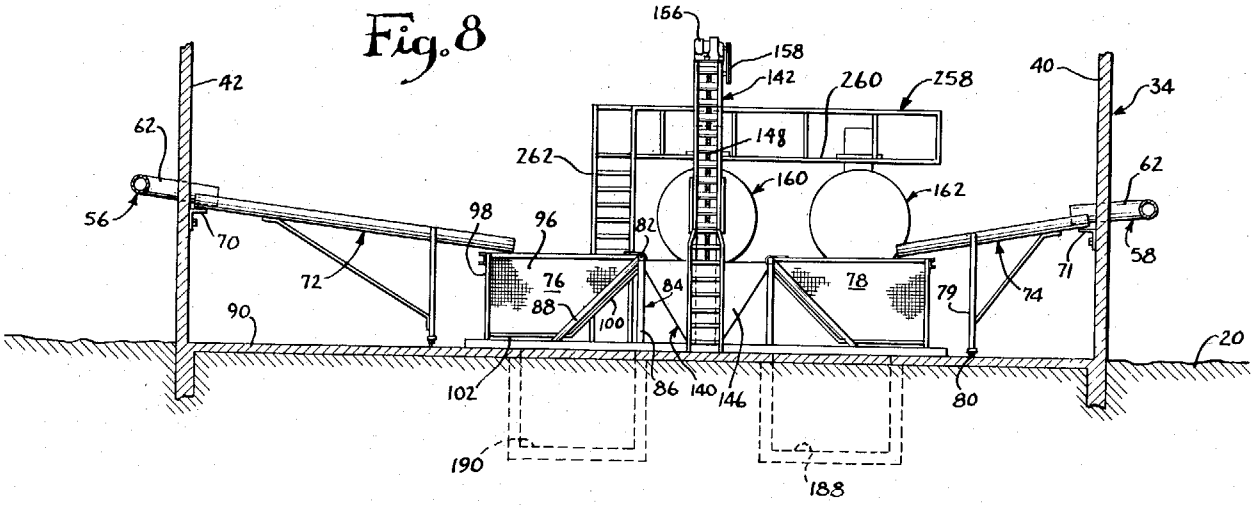
FIG. 8 is a sectional view taken substantially along the line 8—8 of FIG. 6.

Referring to FIGS. 6, 7, 8 and 9, the endmost conduit section 62 in each sluiceway 56 and 58 projects into the building 34 an appreciable distance as best seen in FIG. 8 and passes over a supporting bracket or shelf member 71 secured to the inside face of the adjacent wall surface. The inner end of the *endmost* conduit section 62 [associated with] *of* the feather transporting sluiceway 56 is adapted to overlie one end of a portable trough member 72 which is supported on the shelf member 70 beneath the discharge end of [the] *said* conduit section. Similarly, the inner end of the *endmost* conduit section [associated with] *of* the [sluiceway] offal transporting sluiceway 58 is adapted to overlie one end of a portable trough member 74 which likewise is supported on the adjacent shelf member 70. The inner ends of the two trough members 72 and 74 are designed for selective register wtih respective pairs of tiltable dump pans or screening bins, the bins associated with the trough member 72 being designated [at] *by the reference numeral* 76 and the bins associated with the trough member 74 being designated [at] *by the reference numeral* 78. The medial regions of the trough members 72 and 74 are supported by supports 79 carrying traction rollers 80 at their lower ends and by means of which the supports and troughs carried thereby may be slid bodily between selective positions of register wherein the inner ends of the troughs overlie the respective pairs of screening bins 76 or 78 as the case may be.

Figure 6:
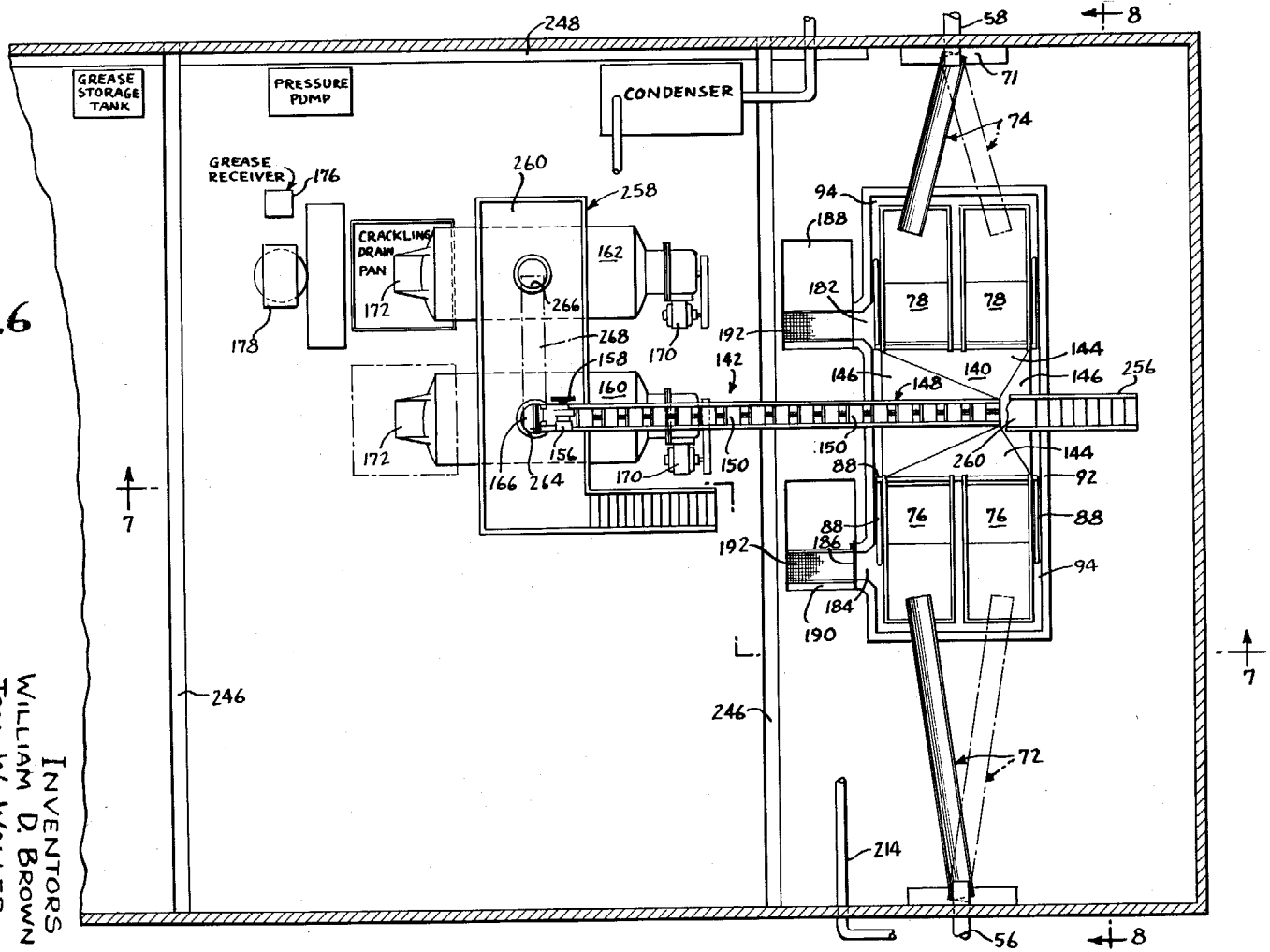
FIG. 6 is a schematic top plan view, partly in section, of a portion of the system within the rendering plant and illustrating, principally, the handling of the by-product waste material solids.
Figure 7:
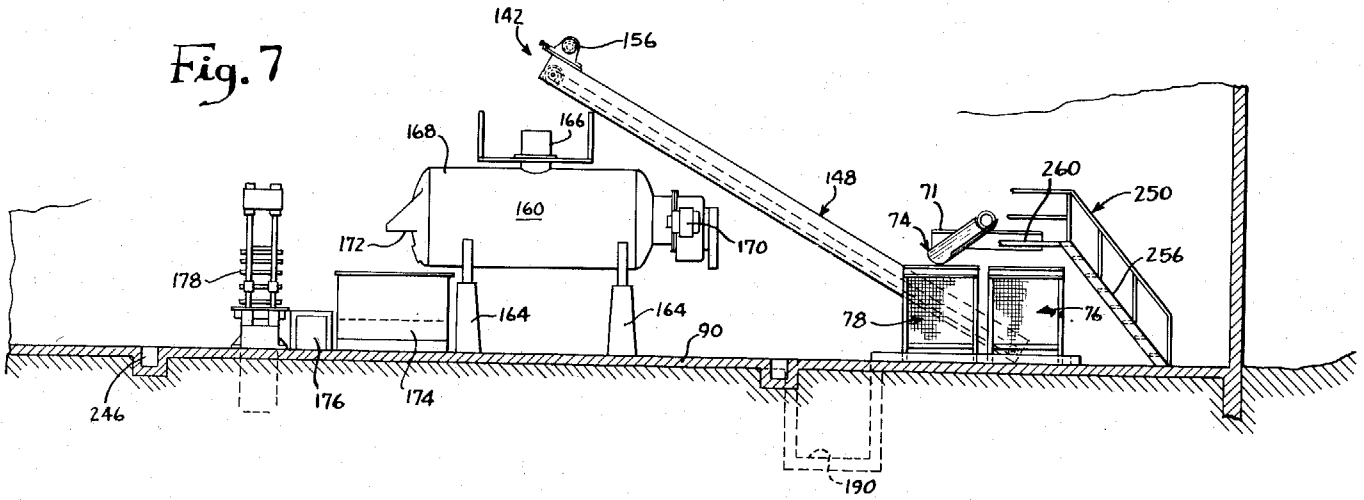
FIG. 7 is a sectional view taken substantially along the line 7—7 of FIG. 6.
Figure 9:
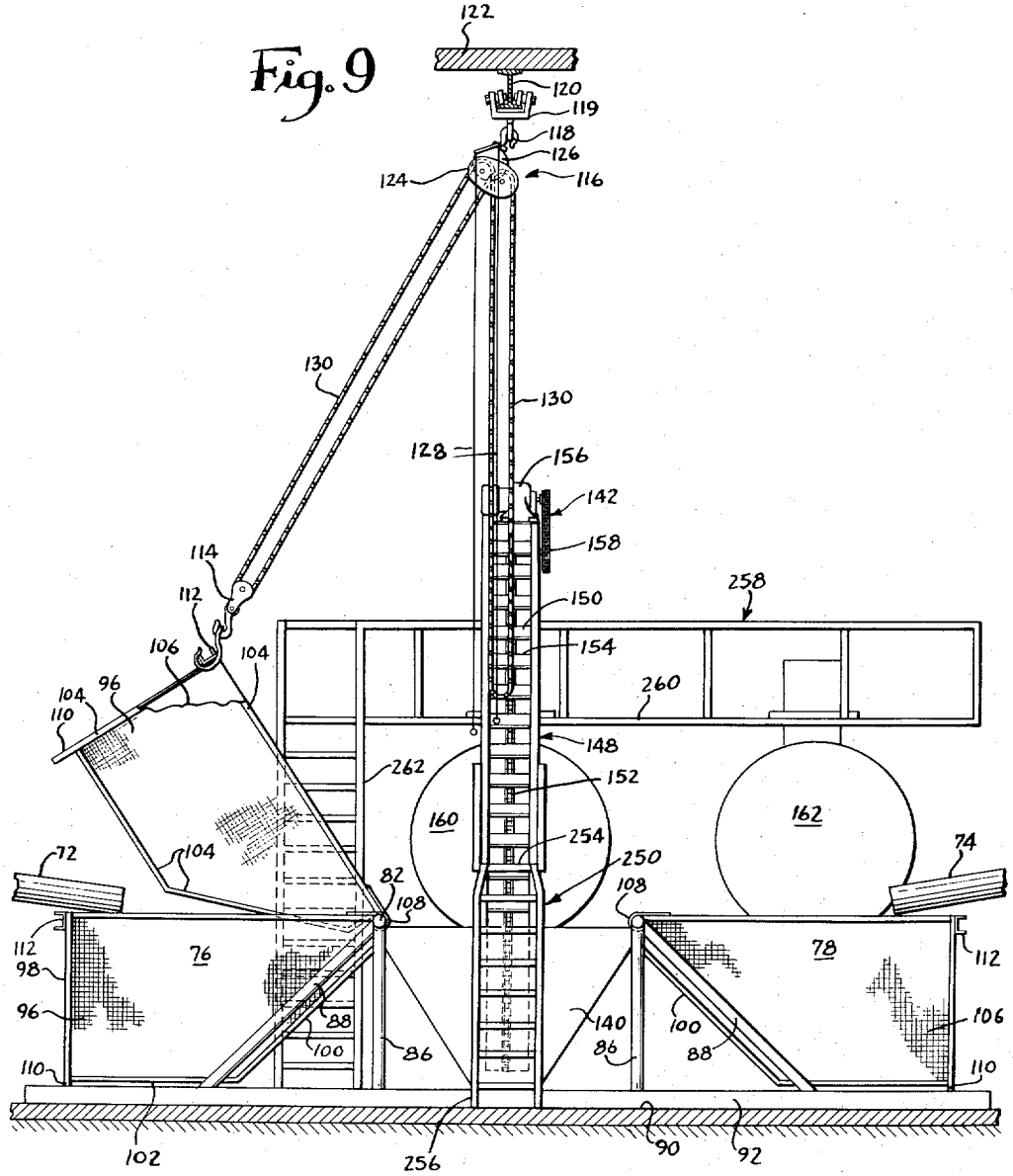
FIG. 9 is a fragmentary and elevational view of a portion of the material handling-equipment illustrating the manner in which certain screening bins employed in connection with the invention are discharged of their contents.

Still referring to FIGS. 6 and 9, inclusive, each pair of bins 76 and 78 is mounted for tilting movement on a horizontally extending rod 82 forming a component element of a rack assembly 84 including vertical members 86 and inclined struts 88 the lower ends of which are suitably anchored to the building floor 90. The floor 90 is preferably formed of concrete and it is supported directly on the ground surface and the entire bin assembly including the two pairs of screening bins 76 and 78, together with their supporting structures, are surrounded by a generally rectangular curb 92, which may be from six to eight inches in height and which curb 92 defines a central enclosure 94 for confining the [wash] water issuing from the troughs 72 and 74 in the form of a shallow pool for purposes that will be made clear presently.

As best seen in FIGS. 8 and 9, each screening bin 76 or 78, as the case may be, is generally in the form of an open top basket-like structure having trapezoidal sides 96, a vertical rectangular outside end wall 98, an inclined rectangular inside end wall 100, and a horizontal rectangular bottom 102. The bins may have a skeletal marginal frame structure comprised of suitable structural members such as angle bars 104 or the like which are bridged by screen paneling 106 (FIG. 9). The upper horizontal members 104 may be formed with hook-like or loop portions 108 which encircle the horizontal rod 82 of the supporting frame structure, thus establishing the pivotal connection for the bin and the vertical members 104 of the outside end wall 98 are formed with foot extension 110 adapted to be supported on the concrete floor 90 when the bin is in its normal horizontal position of rest so that the bottom 102 will be maintained slightly elevated from the floor. The two horizontally disposed supporting rods 82 extend in spaced parallelism longitudinally of the building enclosure and the bins 76 and 78 of each pair of bins, respectively, are disposed in close proximity to each other and on the outside of the space defined between the two bin supporting framework structures. Each bin may have associated therewith a channel member 112 which extends across the upper edge of the outside wall 98 and designed for cooperation with a lifting hook assembly 114 forming one element of a conventional electric hoisting mechanism designated in its entirety [at] *by the reference numeral* 116 and which is suitably attached as at 118 to a trolley carriage 119 tractionally carried on a suspension trolley beam 120 affixed to an overhead support 122 forming a part of the building framework. The hoisting mechanism 116 is purely conventional in its design and its construction forms no part of the present invention. It is deemed sufficient for descriptive purposes herein to state that the mechanism 116 is of the chain fall type offering a substantial mechanical advantage through the medium of suitable gearing enclosed within a housing 124 and driven by an electric motor 126 operable under the control of a pair of control cords 128 in the usual manner of operation of such hoisting mechanisms. The mechanism has associated therewith an endless chain 130 which extends into the housing 124 and is operatively connected with the gearing contained therein, the chain 130 serving to support the hook assembly 114. In order to empty the contents of one of the screening bins 76 or 78, the hook assembly 114 may be engaged with the channel member 112 as illustrated in FIG. 9 and thereafter the hoisting mechanism 116 operated under the control of the cords 128 to elevate the outer end of the bin until such time as the normally inclined end wall 100 of the bin is swung to a position wherein the contents of the bin will slide by gravity along this wall and cause the contents of the bin to be dumped into the space existing between the two pairs of bins 76 and 78. By reversing the operation of the motor 126 under the control of the cords 128, the empty bin may be restored to its normal upright position with the foot portions 110 thereof resting on the concrete floor surface.

Referring now to FIGS. 6 to 9, inclusive, in order to receive the materials which are discharged from the various screening bins 76 and 78 upon dumping thereof, a conveyor sump or hopper 140 is provided at the lower end of an inclined drag-type conveyor assembly 142 and is positioned in the space existing between the two bin-supporting rack assemblies 84. The sump 140 is provided with inclined side and end walls 144 and 146, respectively, and the lower end of the conveyor ramp 148 forms a portion of the sump bottom as best seen in FIG. 6.

The conveyor ramp 148 is of trough shape design and has a smooth ramp bottom 150 along which the materials for the cookers are adapted to be impelled under the influence of an endless conveyor chain 152 having transverse flights 154 which ride upon the ramp bottom 150. The conveyor chain 152 is adapted to be driven by an electric motor 156 mounted on the upper end of the ramp 148, a chain and sprocket driving mechanism 158 being provided for driving purposes. The conveyor ramp 148 extends upwardly and rearwardly of the building to a region overlying the upper receiving ends of a pair of conventional rendering cookers 160 and 162 supported and pedestals 164 and having charging stacks 166 providing filling openings into which the materials issuing from the upper end of the conveyor ramp 148 may selectively be discharged.

The cookers 160 and 162 form no part of the present invention, the passage of materials upwardly along the conveyor ramp 148 and the discharge of these materials at the upper end of the ramp constituting the last step in the handling thereof according to the method of the invention. Further treatment of these materials such as the rendering thereof in the cookers 160 and 162 and the subsequent treatment of the rendered product are incidental to the manufacture of the hydrolyzed feather meal and need be but briefly described in connection with the schematic illustration of FIGS. 6 and 7.

Figure 5:
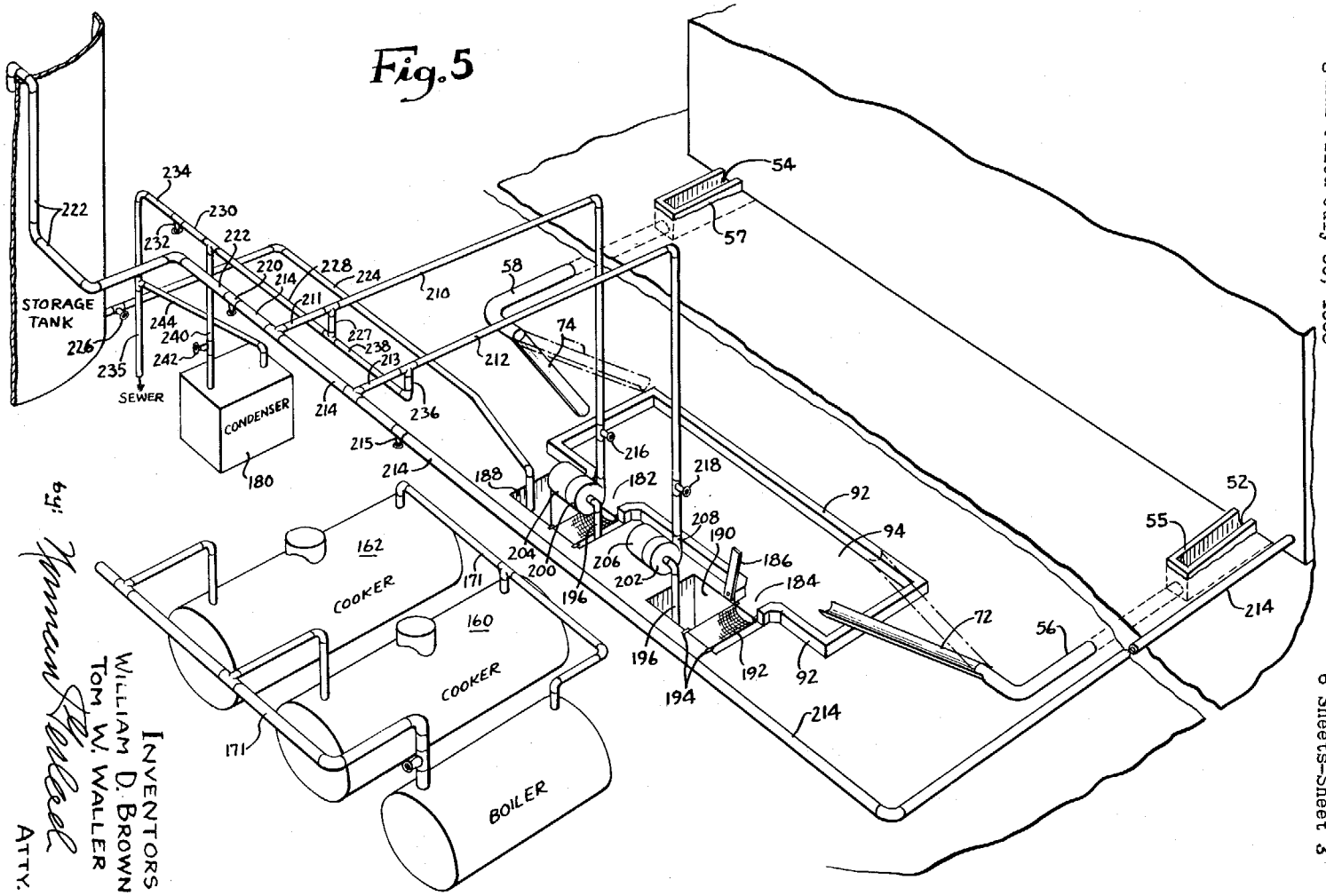
FIG. 5 is a fragmentary perspective view, somewhat schematic in its representation, illustrating the circulation of water in the system during operation thereof.

The cookers 160 and 162 may be of the general type shown and described in the patent to Illsley, No. 2,673,790, dated March 30, 1954, and entitled "Rendering Cooker." Briefly, each cooker comprises a cylindrical steam-jacketed shell 168 for effecting high pressure cooking of the material which is circulated through the interior of the shell chamber and which has been introduced into the shell through the charging stack 166. Steam is supplied to and circulated through the shell 168 from a boiler 169 through a suitable conduit system 171. An electric motor 170 drives the agitating mechanism (not shown) by means of which the material is circulated and the shell is provided with the usual discharge door opening 172 which may be brought into proper register with a suitable cracking pan or separator device 174 by means of which the grease is separated from the cracklings after any given cooking cycle. A grease receiver is shown at 176, [a grease storage tank at 177,] and a crackling press at 178, the latter serving to press the cracklings from the cookers 160 and 162 into circular cakes weighing approximately 17 pounds. These cakes may be subsequently ground into meal by suitable pulverizing apparatus (not shown), and after packaging, the product, i.e., the hydrolyzed feather meal, transported to the loading platform 50. The cookers 160 and 162 have associated therewith the usual condenser [or condenser bank] 180 including heat exchange coils (not shown) by means of which cooker vapors are cooled, thus creating vacuum pressure at the vapor outlets of the cookers in a manner well known in the art. The vapor outlets and operative connections therefor leading to the condenser 180 have not been illustrated herein [and reference may be had to the above-mentioned patent to Illsley for a full understanding of cooker operation, including vapor condensation in connection therewith]. In FIG. 5 of the present application, however, the means for admission of cooling water to the condenser coils according to the present invention has been disclosed and a description thereof will be made presently when the circulation of water in the system for material-floating or transporting purposes and its subsequent use as a coolant is discussed.

One of the principal features of the present method and apparatus resides in the expeditious use of water in the system for transporting the feathers along the sluiceway 56, for transporting the offal along the sluiceway 58, for prolonged washing of the feathers and offal, and for finally cooling the condenser coils of the condenser 180. The hydraulic circuitry involved in the system has been schematically illustrated in FIG. 5. Referring now to this view, the generally rectangular curb *92* is provided with two open gateways 182 and 184, each adapted to be closed by a hinged gate member 186. The gateways 182 and 184 communicate with respective sumps 188 and 190 (see also FIGS. 7 and 8) provided in the concrete floor 90. The sumps may have associated therewith suitable fine screen baskets or trays 192, loosely resting on supports 194 and adapted to catch any waste material which may spill or otherwise escape from or around the various screening bins 76 and 78. A stand pipe 196 extends into each sump and has its upper end communicating with the inlet side of respective suction pumps 200 and 202, operable under the control of respective electric motors 204 and 206. The outlet side of the pump 200 is connected by pipe sections 210 and 211 to a return conduit 214 which extends generally parallel to the sluiceway 56, passes through the wall 42 of the building 34 (see FIG. 1), and extends exteriorly of the building along the incline 16 and enters the building 22 for return of water [which initially has been used] to float the feathers along the sluiceway 56 [so that this same water may be used to float the offal along the sluiceway 58] in a manner that will become clear when the operation of the system is set forth. Similarly, the pump 202 is connected by pipe sections 212 and 213 to return conduit 214. Shut-off valves 216 and 218 are interposed in the pipes 210 and 212, respectively, so that either pump may be disassociated from the system if desired. A shut-off valve 219 is interposed in the conduit 214.

The return conduit 214 is operatively connected through a shut-off valve 220 with a conduit 222 leading to the storage tank 46 for tank filling purposes. A conduit 224 extends from the tank 46 to the sump 188 and has a shut-off valve 226 interposed therein. The conduit is provided for supplying reserve or stored water to the system at such times as water is not available from the sluiceways 56 and 58. The conduits 210 and 211 communicate through pipe sections 227, 228, 230, shut-off valve 232 and pipe sections 234 and 235 to the sewer 48. The conduits 212 and 213 communicate with the sewer 48 through pipe sections 236, 238, 228, 230, valve 232 and pipe sections 234 and 235. The pipe sections 228 and 230 communicate with a pipe section 240 by means of which cooling water may be conducted to the condenser 180. A valve 242 is interposed in the pipe section 240. Spent cooling water may be discharged to the sewer through pipe sections 244 and 235. As shown in FIG. 6, a plurality of spaced transverse gutters 246 may extend across the concrete floor 90 at appropriate regions therealong and communicate with a manifold gutter 248 which discharges into the sewer 48 through the building wall 40, such gutters being effective during clean-up operations.

In the operation of the above-described system, the operations at the rendering plant 14 will, insofar as practicable, be correlated with the processing operations conducted at the packing plant 10. Except for a brief midday lunchtime shutdown, processing operations at the packing plant are continuous commencing immediately after the entire day's kill has been unloaded from the trucks into the live holding area of the plant, and continuing until the supply of birds has been exhausted, preparatory to the final clean-up operations. The principal operations at the processing plant 10 which are related to the operations at the rendering plant 14 are the picking operation and the eviscerating operation including the removal of heads and feet. Since these operations continue throughout the day, the rendering plant is assured of a substantially constant supply of feathers and offal from shortly after the processing plant commences its early morning operations until the processing plant is shut down in the evening. In the embodiment of the invention illustrated herein, it may be assumed that the daily capacity of the processing plant will accommodate two full cooker loads for each of the cookers 160 and 162, or, in other words, the complete processing of four cooker loads in all. The equipment at the rendering plant 14 is preferably so designed that each cooker, when filled to capacity, will retain the contents of two of the screening bins 76 or 78 and thus, for convience, the cooker [76] *160* on the same side of the building 34 as the screening bins 76 may be employed in the digesting of feathers while the cooker [78] *162* on the same side of the building as the screening bins 78 may be employed in the digesting of offal.

It is contemplated that the water used in the system be furnished by the packer, and immediately upon commencement of processing operation, the packer will supply *fresh* water to the sluiceway [56] *58* to charge the system preparatory to release of feathers and offal at the discharge openings 52 and 54. At the rendering plant, if both pumps 200 and 202 are to be employed, the valves 216 and 218 will be opened while the valves 220 and 232 will be closed. Thus, charging water supplied from the dischage outlet [52] *54* and flowing by gravity along the sluiceway 58 and ultimately reaching the sumps 188 and 190 by way of the portable trough member [72] *74* and pool 94 within the curb 92, will be pumped to the return line 214 through pipe sections 210, 211, 212 and 213 and thus be returned to the building 22 from whence it may be released to the discharge opening [54] *52* and caused to flow by gravity through the sluiceway [58] *56* and portable trough [74] *72* and be returned to the pool 94.

By the time that [feathers] *offal* resulting from [picking] *eviscerating* operations at the plant 10 [are] *is* available at the discharge opening [52] *54*, the system is fully charged and a continuous flow of water-borne [feathers] *offal* will issue from the opening [52] *54* and flow along the sluiceway [56] *58*. The portable trough [70] *74* is positioned as previously described so that one end thereof is in register with the discharge end of the endmost conduit section [66] *62* of the sliceway [56] *58* and the other end thereof overlies and rests upon an edge of one of the two screening bins [76] *78*, as best seen in FIG. 6, whereupon the water-borne [feathers] *offal* issuing from the trough [70] *74* will enter the bin and be retained therein. The water passing into the bin [76] *78* from the trough [70] *74* will pass through the screen openings and fall into the pool 94 and eventually find its way to the sumps 188 and 190 from whence it may be withdrawn by the respective pumps 204 and 206 and returned to the processing plant 10 through the return conduit 214. The water thus returned to the plant 10 is released from the discharge openings [54] *52* and, as soon as [offal is] *feathers are* available from the [eviscerating] *picking* room of the plant 10, [it is] *they are* released at the opening 52 and [is] *are* waterborne along the sluiceway [58] *56* under the influence of gravity. The portable trough 72 is positioned as previously described so that it operatively connects the lower end of the sluiceway [58] *56* with one of the screening bins [78] *76* and thereafter [offal is] *feathers are* collected in this bin until such time as it becomes filled. As is the case in connection with the bin [76] *78*, the filtrate water passes through the bin perforations and enters the pool 94.

The above-described initial flow of fresh water from the plant 10 to the plant 14 by way of the offal-transporting sluiceway [56] *58*, the return of such water to the plant 10 by way of the return conduit 214, and the subsequent flow of such water along the feather-transporting sluiceway [58] *56* to the plant 14 will be continued throughout the entire day's operation with the fresh water serving to float the offal and the [once] *previously*-used water serving to transport the feathers. It is to be noted at this point that at all regions within the closed circuit, wherever the feathers and offal are in direct contact with the water, a washing action takes place. The body of water in the system thus serves the dual purpose of, first, transporting the waste by-product materials from the processing plant 10 to the rendering plant 14 and, secondly, of washing the materials continuously during the entire transporting period.

At such time as either the feather-receiving screening bin 76 or the offal-receiving screening bin 78 becomes filled to capacity, the associated portable trough 70 or 72 is transferred to the other basket of the pair and screening operations continue during filling of the second basket, with the system otherwise remaining undisturbed.

As previously stated, the capacity of each cooker 160 and 162 is such that it may be fully charged with the contents of any two of the various screening bins and thus, when the four bins are filled, cooker-charging operations are resorted to wherein the feather-content of the screening bins 76 are charged in the cooker 160 and the offal-content of the screening bins 78 are charged in the cooker 162. The manner in which such cooker-charging operations are conducted will be described presently.

When the four screening bins 76 and 78 are filled and charging operations are in order, the pumps 204 and 206 may, if desired, be temporarily disabled by deenergizing the electric motors 200 and 202.

Cooker charging operations are effected by successive dumping of the various screening bins 76 and 78 in any desired order of emptying. The overhead automatic hoisting mechanism 116 is employed for this purpose and, to facilitate handling of the mechanism, a platform structure designated in its entirety at 250 and having a cat-walk 254 overlying the conveyor hopper 140 and a ladder 256 leading thereto is provided. The bins 76 and 78 are tilted one at a time and their contents discharged into the common conveyor hopper from whence the materials will be conducted upwardly along the conveyor ramp 150 toward the cooker installation 160, 162.

Similarly, to facilitate charging of the cookers, a platform structure 258 having a cat-walk 260 spanning the distance between and overlying the cookers 160 and 162 and connected to the cat-walk 254 by a ladder 262 is provided. The operator, standing on the cat-walk 260, is thus enabled to attend to the charging operations of both cookers 160 and 162. The upper end of the conveyor ramp bottom 150 is in register with the charging stack 166 of the cooker 160 so that [materials] *feathers* issuing from the conveyor may fall by gravity through an opening 264 in the cat-walk 260 directly into the cooker *160*. A similar opening 266 in vertical register with the charging stack 166 of the cooker 162 may be fed with [materials] *offal* issuing from the conveyor ramp by means of a suitable portable trough 268.

The cooking time for the materials thus introduced into the cookers 160 and 162 is approximately four hours, and during this cooking period, which may commence shortly after the mid-way shut-down period has expired as stated above, the pump motors 204 and 206 are again energized and the filling of the screening bins 76 and 78 again commenced for the second or afternoon run.

During the afternoon run, which is conducted in precisely the same manner as the previously described morning run, water may be supplied to the condenser [bank] 180 by the simple expedient of opening the [valves 220 and] *valve* 242 so that so-called sump water from the sumps 188 and 190 will be pumped through the pipe sections 210, 227 and 212, [237] *236* to pipe sections 228 and 240 leading to the condenser 180. The expended coolant water may be discharged directly to the sewer 48 through conduit sections 244 and 235.

During the afternoon run, and in order that there may be water available for the condenser [bank] 180 during the evening cooking period which takes place after the processing plant 10 has been closed for the day, the water storage tank 46 may be filled prior to the cooking period, utilizing second-run water, which is to say water that has been used first to float offal from the discharge outlet [52] *54*, and secondly, to float feathers from the discharge outlet [54] *52*. Filling of the tank 46 is accomplished by closing the valves 215 and [225] *226* and opening the valve 220, while allowing the pumps 200 and 202 to operate. The stored water in the tank 46 is made available to the system through the conduit 224 by opening the valve [225] *226* and allowing the water to flow to the sump 188 from whence it may be withdrawn for condenser operation as previously described.

The invention is not to be limited to the exact arrangement of equipment shown in the accompanying drawings or described in this specification as various changes in the details of construction may be resorted to without departing from the spirit of the invention. For example, in the illustrated embodiment of the invention, which is purely exemplary, the water-borne flow of materials from the processing plant 10 to the rendering plant 14 has been predicated entirely upon the action of gravity in moving the materials along the sluiceways 56 and 58, as well as causing them to enter the building 34, flow toward and through the screening bins 76 and 78 so that the water may seek the level of the pool 94 within the curb 92. Under certain conditions, for example, where the natural terrain does not afford a downward slope between the processing plant and the rendering plant, the sluiceways 56 and 58 may be replaced by closed conduits for the feathers and offal, respectively, and a suitable materials-pump employed to positively impel the water-borne materials from the processing plant to the rendering plant. Similarly, where such downward terrain slope is not available, it may be found expedient to utilize lifts or elevators for the feathers and offal respectively at the processing plant 10 so that these materials may be brought to a level above that of the pool 94 at the rendering plant 14 and then caused to become water-borne for flow along an artificial sluiceway or through a sloping channel, conduit or the like. Various other modifications are contemplated within the scope of the appended claims.

Having thus described the invention what we claim as new and desire to secure by letters patent is:

1. In the simultaneous but separate production of feed ingredients from the rendering of [chicken] *poultry* offal and [chicken] *poultry* feathers respectively, both derived from a conventional [chicken] *poultry* slaughtering plant during a given run, the method of separately supplying digesting apparatus at a rendering plant with separately available offal from the eviscerating room and feathers from the plucking room of such slaughtering plant, respectively, said method comprising continuously discharging [chicken] *poultry* offal into an artificially created stream of fresh water issuing from the slaughtering plant and flowing to the rendering plant in sufficient quantity and with sufficient velocity to buoyantly transport said offal from the slaughtering plant to the rendering plant, continuously discharging the stream and its offal content into and through a first filtering screening bin to thus progressively fill the bin with the material solids while collecting the filtrate water in an artifically created pool below the bin, continuously pumping the offal-contaminated water from said pool and returning the same to the slaughtering plant, creating a second artificial stream with the thus returned offal-contaminated water and causing the same to issue from the slaughtering plant and flow to the rendering plant at a predetermined velocity, continuously discharging [chicken] *poultry* feathers into said second artificial stream of offal-contaminated water at the slaughtering plant at a rate commensurate with the velocity of said second stream so that said feathers will be buoyantly transported to the rendering plant, continuously discharging the second artificial stream and its feather content into and through a second and separate filtering screening bin to thus progressively fill said latter bin while causing the new offal-contaminated and feather-contaminated filtrate water to be discharged into said pool for admixture with the first offal-contaminated filtrate water issuing from the first filtering screening bin, and, periodically, and at will, selectively and independently conducting the collected filtered offal and the filtered feathers from the first and second filtering bins respectively when filled to the digesting apparatus.

2. In the simultaneous but separate production of feed ingredients from the rendering of [chicken] *poultry* offal and [chicken] *poultry* feathers respectively, both derived from a conventional [chicken] *poultry* slaughtering plant during a given run, the method of supplying digesting apparatus at a rendering plant with separately available offal from the eviscerating room and feathers from the plucking room of such slaughtering plant, respectively, said method comprising continuously discharging [chicken] *poultry* offal into an artificially created stream of fresh water issuing from the slaughtering plant and flowing continuously to the rendering plant in sufficient quantity and with sufficient velocity buoyantly to transport said offal from the slaughtering plant to the rendering plant, continuously discharging the stream and its offal content into and through a first filtering apparatus including a collecting bin to thus progressively fill the bin with the offal solids while collecting the filtrate water in an artificially created pool below the bin, continuously pumping the offal-contaminated water from said pool and returning the same to the slaughtering plant, creating a second artificial stream with the thus returned offal-contaminated water and causing the same to issue from the slaughtering plant and flow continuously to the rendering plant at a predetermined velocity, continuously discharging [chicken] *poultry* feathers into said second artificial stream of offal-contaminated water at the slaughtering plant at a rate commensurate with the velocity of said second stream so that said feathers will be buoyantly transported to the rendering plant, continuously discharging the second artificial stream and its feather content into and through a second and separate filtering apparatus including a collecting bin to thus progressively fill said latter bin with feather solids while causing the now offal-contaminated and feather-contaminated filtrate water to be discharged, and periodically, and at will, selectively and separately conducting the collected filtered offal solids and filtered feather solids from the bins of the first and second filtering apparatus respectively to the digesting apparatus.

3. The combination with a [chicken] *poultry* slaughtering plant having an eviscerating room and a plucking room, and an adjacent rendering plant for the simultaneous but separate production of feed ingredients from the rendering of [chicken] *poultry* offal and [chicken] *poultry* feathers, respectively, both derived from said slaughtering plant during a given run, of apparatus for transporting said offal and feathers from the former plant to the latter plant and for charging the same into separate rendering cookers at the rendering plant for separate digestion thereof in the production of said feed ingredients, said apparatus comprising means at said rendering plant establishing an open pool, a first supply conduit extending between said eviscerating room and the rendering plant and having its discharge end overlying said pool, a second supply conduit extending between the plucking room and the rendering plant and having its discharge end overlying said pool, separate filtering apparatus overlying said pool and in register with the discharge ends of said conduits respectively for cumulatively collecting material-solids issuing therefrom and for discharging filtrate water into said pool, a conveyor common to said filter apparatus and having a ramp extending between said filtering apparatus and the cooker apparatus for conveying the collected material-solids from the former apparatus to the latter apparatus, means for supplying fresh water to said first supply conduit at the slaughtering plant for the flotation of offal to the rendering plant, a return conduit extending between said plants for returning filtrate water, resulting from such flotation of offal, to the rendering plant for use in the flotation of feathers to the slaughtering plant through said second supply conduit, a pump having its inlet side operatively connected to the pool and its outlet side operatively connected to the return conduit, and discharge means at said rendering plant, operable at will, for causing selective discharge of the accumulated contents of said filtering apparatus onto said conveyor ramp.

4. The combination set forth in claim 3 *and* wherein the liquid level of said pool is disposed below the overall level of said first and second supply conduits and wherein said latter conduits are in the form of gravity-flow sluiceways.

5. The combination set forth in claim 4 *and* wherein each of said filtering apparatus comprises an open screening bin mounted for tilting movement about a horizontal axis and movable between an upright material-receiving position and an inclined material-discharging position wherein the bin is in discharging register with the conveyor ramp, and wherein said discharge means comprises an overhead electric hoist engageable with the screening bin for bin-tilting purposes.

6. Apparatus for separately receiving water-borne poultry feathers and water-borne poultry offal discharged at a rendering plant installation through respective discharge openings leading from respective sluiceways extending to an adjacent poultry processing plant and for separately conducting the feathers and offal to the charging stacks of a pair of rendering cookers, said apparatus comprising a water-impervious rendering plant floor, a closed confining curb on said floor establishing an open pool for water discharged from said openings, filtering means including a pair of screening bins, one for the offal and one for the feathers, mounted for tilting movement between upright and tilted positions above said pool, a conduit for each bin having one end thereof in register with one of said discharge openings and its other end in register with the bin, said bins being adapted to cumulatively collect the material-solids from [its] *their* respective [conduit] *conduits* and to discharge the filtrate water therefrom into said pool, a charging conveyor common to said bins and having a conveyor ramp the lower end of which is in register with said bins when the latter are tilted and the upper end of which is disposed in the vicinity of said cooker charging stacks, a pump having its inlet side in operative communication with said pool and having its outlet side in communication with a water inlet opening at the poultry processing plant for return of water from the pool to the latter plant for use in one of said sluiceways, and means for selectively tilting said screening bins.

7. Apparatus as claimed in claim 6 *and* wherein said filtering means includes, additionally, a companion bin for each of said screening bins of the pair of bins and wherein each of said conduits is portable with its said other end selectively movable into register with its respective bin and the companion bin thereof, whereby cumulative filling of one bin may take place during tilting of the companion bin.

8. Apparatus for separately receiving water-borne poultry feathers and water-borne poultry offal discharged at a rendering plant installation through respective discharge openings leading from respective sluiceways extending to an adjacent poultry processing plant and for separately conducting the feathers and offal to the charging stacks of a pair of rendering cookers having a water-cooled vapor-condenser operatively associated therewith, said apparatus comprising a water-impervious rendering plant floor, a confining curb on said floor establishing an open pool for water discharged from said openings, a pair of screening filter bins, one for the offal and one for the feathers, mounted for tilting movement between upright and tilted positions above said pool, a conduit for each bin having one end thereof in register with one of said discharge openings and its other end in register with the bin, said bins being adapted to cumulatively collect the material-solids from [its] *their* respective [conduit] *conduits* and to discharge the filtrate water therefrom into said pool, a charging conveyor common to said bins and having a conveyor ramp the lower end of which is in register with said bins when the latter are tilted and the upper end of which is disposed in the vicinity of said cooker charging stacks, a pump having its inlet side in operative communication with said pool and having its outlet side in communication with a water inlet opening at the poultry processing plant for return of water from the pool to the latter plant for use in *one of* said sluiceways, means for selectively tilting said screening bins, said pump also having its outlet side in communication with said vapor-condenser, and a shut-off valve interposed between said outlet side of the pump and said vapor-condenser.

9. Apparatus for separately receiving water-borne poultry feathers and water-borne offal discharged at a rendering plant installation through respective discharge openings leading from respective sluiceways extending between the rendering plant and an adjacent poultry processing plant and for separately conducting the feathers and offal to the charging stacks of a pair of rendering cookers having a water-cooled [condenser] vapor-condenser operatively associated therewith, said apparatus comprising a shut-off valve in said latter conducit, a discharge conduit on said floor establishing an open pool for water discharged from said openings, a pair of screening filter bins, one for the offal and one for the feathers, mounted for tilting movement between upright and tilted positions above said pool, a conduit for each bin having one end thereof in register with the bin and the other end in communication with one of said discharge openings, said bins being adapted to cumulatively collect the material-solids from its respective conduit and to discharge the filtrate water therefrom into said pool, a cooker-charging conveyor common to said bins and having a ramp the lower end of which is in register with said bins when the latter are tilted and the upper end of which is in the vicinity of said cooker-charging stacks, a pump having its inlet side in operative communication with said pool, a return conduit extending between the outlet side of the pump and a water inlet opening at the poultry processing plant for reuse in one of said sluiceways, means for selectively tilting said screening bins, a conduit connecting the outlet side of said pump with the water inlet side of said condenser, a shut-off valve in said latter conduit, a storage reservoir for water, a reservoir-filling conduit connecting the outlet side of said pump and the reservoir, a shut-off valve in said latter conduit, a discharge conduit connecting said reservoir and the inlet side of said condenser, a shut-off valve in said latter conduit, and a conduit connecting the outlet side of the condenser to a region of water discharge.

10. The combination with a [chicken] *poultry* slaughtering plant having an eviscerating space and a plucking space, and an adjacent rendering plant for the simultaneous but separate production of feed ingredients from the rendering of [chicken] *poultry* offal and [chicken] *poultry* feathers, respectively, both derived from said slaughtering plant during a given run, of apparatus for transporting said offal and feathers from the slaughtering plant to the rendering plant and for charging the same into digesting apparatus at the rendering plant for separate digestion thereof in the production of said feed ingredients, said apparatus comprising means at said rendering plant establishing an open pool, a first supply conduit extending between the eviscerating space and the rendering plant and having its discharge end overlying said pool, a second supply conduit extending between the plucking space and the rendering plant, a first filtering apparatus overlying said pool and in register with the discharge end of the first supply conduit for cumulatively collecting material-solids issuing therefrom and for discharging the filtrate water into said pool, a second filtering apparatus in register with the discharge end of the second supply conduit for cumulatively collecting material-solids issuing therefrom and for discharging the filtrate water, means for supplying fresh water to said first supply conduit at the slaughtering plant for the flotation of offal to the rendering plant, a return conduit communicating with said pool and extending to said plucking space for returning the filtrate water in said pool resulting from the flotation of offal, to the plucking space for use in the flotation of feathers to the rendering plant through said second supply conduit, a pump having its inlet side operatively connected to the pool and its outlet side operatively connected to the return conduit, a conveyor common to said filtering apparatus and extending between the same and the digesting apparatus, and discharge means at said rendering plant and operable at will for causing selective discharge of the material-solids accumulated by the two filtering apparatus onto said conveyor.

*11. In the simultaneous but separate production of feed ingredients from the rendering of poultry offal and poultry feathers both derived from a conventional poultry slaughtering plant during a given run, the method of supplying digesting apparatus at the rendering plant with separately available offal from the eviscerating room and feathers from the plucking room of such slaughtering plant, respectively, said method comprising continuously discharging poultry offal into an artificially created stream of fresh water issuing from the slaughtering plant and flowing continuously to the rendering plant in sufficient quantity and with sufficient velocity to transport said offal from the slaughtering plant to the rendering plant, continuously separating the offal from the offal-contaminated water of the stream at the rendering plant and at the same time collecting the offal-contaminated water after the offal has been separated from it, returning the collected offal-contaminated water to the slaughtering plant, creating a second artificial stream with the returned offal-contaminated water and causing the same to issue from the slaughtering plant and flow continuously to the rendering plant at a predetermined velocity, continuously discharging poultry feathers into said second artificial stream at the slaughtering plant at a rate commensurate with the velocity of said second stream so that said feathers will be transported to the rendering plant, continuously separating the feathers from the offal-contaminated and feather-contaminated water of said second stream and at the same time discharging the last-mentioned water after the feathers have been separated therefrom, and periodically and at will selectively and separately conducting the separated offal and the separated feathers to the digesting apparatus for rendering therein.*

*12. In the simultaneous but separate production of feed*

*ingredients in the rendering of poultry offal and poultry feathers both derived from a conventional poultry slaughtering plant during a given run, the method of supplying digesting apparatus at the rendering plant with separately available offal from the eviscerating room and feathers from the plucking room of such slaughtering plant, respectively, said method comprising continuously discharging poultry offal into an artificially created stream of fresh water issuing from the slaughtering plant and flowing continuously to the rendering plant in sufficient quantity and with sufficient velocity to transport said offal from the slaughtering plant to the rendering plant, continuously separting the offal from the offal-contaminated water of the stream at the rendering plant and at the same time collecting in a pool at the rendering plant the offal-contaminated water after the offal has been separated from it, returning the collected offal-contaminated water to the slaughtering plant by pumping it from the pool back to said slaughtering plant, creating a second artificial stream with the returned offal-contaminated water and causing the same to issue from the slaughtering*

*plant and flow continuously to the rendering plant at a predetermined velocity, continuously discharging poultry feathers into said second artificial stream at the slaughtering plant at a rate commensurate with the velocity of said second stream so that said feathers will be transported to the rendering plant, continuously separating the feathers from the offal-contaminated and feather-contaminated water of said second stream and at the same time discharging the last-mentioned water after the feathers have been separated therefrom, and periodically and at will selectively and separately conducting the separated offal and the separated feathers to the digesting apparatus for rendering therein.*

References Cited in the file of this patent or the original patent

| | | |
|---|---|---|
| 1,210,408 | Brockhausen | Jan. 2, 1917 |
| 1,489,940 | Hiller | Apr. 8, 1924 |
| 1,567,014 | Taylor | Dec. 22, 1925 |
| 2,631,899 | Jullien | Mar. 17, 1953 |
| 2,702,245 | Mayer | Feb. 15, 1955 |